United States Patent [19]
Welner

[11] Patent Number: 5,123,744
[45] Date of Patent: Jun. 23, 1992

[54] SYSTEM AND METHOD FOR DETECTION AND IDENTIFICATION OF LASER WAVELENGTHS

[76] Inventor: Jerome M. Welner, 1156 8th St., Manhattan Beach, Calif. 90266

[21] Appl. No.: 617,726

[22] Filed: Nov. 26, 1990

[51] Int. Cl.[5] .................................................. G01J 3/51
[52] U.S. Cl. .................................. 356/416; 356/419; 356/225
[58] Field of Search ................ 356/416, 419, 225, 226

[56] References Cited

U.S. PATENT DOCUMENTS

| | | |
|---|---|---|
| 3,210,552 | 10/1965 | Young . |
| 3,612,691 | 10/1971 | Schwartz .............................. 356/345 |
| 3,761,184 | 9/1973 | McLaughlin, Jr. ................. 356/416 |
| 3,929,398 | 12/1975 | Bates .................................... 356/416 |
| 3,992,110 | 11/1976 | Frazer et al. ......................... 356/419 |
| 4,027,974 | 6/1977 | Bumgardner ....................... 356/320 |
| 4,037,959 | 7/1977 | Bumgardner ....................... 356/225 |
| 4,101,767 | 7/1978 | Lennington et al. . |
| 4,162,052 | 7/1979 | Lamelot . |
| 4,229,659 | 10/1980 | Vaselich et al. . |
| 4,249,168 | 2/1981 | Muggli . |
| 4,266,130 | 5/1981 | Kuhn . |
| 4,346,992 | 8/1982 | Schwartz . |
| 4,980,554 | 12/1990 | Ahn ..................................... 250/394 |

FOREIGN PATENT DOCUMENTS 3231025  2/1984  Fed. Rep. of Germany ...... 356/416

*Primary Examiner*—F. L. Evans
*Attorney, Agent, or Firm*—William J. Streeter; Wanda K. Denson-Low

[57] ABSTRACT

Each of three or more telescopic filters in pairs of filters and detectors therefor has very narrow passband lines centered about laser wavelengths and nearby guardbands. As defined, a passband is any wavelength region of the spectrum permitted by a system to pass through to a detector, and a guardband is a spectral region near but not including the laser lines of interest. Each laser wavelength is simultaneously detected in exactly two detectors. Associated with each wavelength is a guardband near that wavelength, which is used to detect and reject broader band radiation. False alarms are made rare by proper parameter selection.

5 Claims, 4 Drawing Sheets

SYSTEM AND METHOD FOR DETECTION AND IDENTIFICATION OF LASER WAVELENGTHS

BACKGROUND OF THE INVENTION

1. Field of the Invention

The present invention relates to a system and method for detection and identification of laser wavelengths and, more particularly, to the use of filters having passbands which include wavelengths of interest to be identified and guardbands which ensure that radiation of no interest will be identified as being of no interest.

As used herein, the term "passband" is defined as any wavelength region of the spectrum which is permitted by an optical system to pass through it to a detector. Such passage through the system may be effected by use of a transmissive or a reflective filter. The term "guardband" is defined as a spectral region near but not including the narrow band or laser wavelength or line of interest.

2. Description of Related Art and Other Considerations

There are many applications in the laboratory and in the field where it is necessary to identify specific laser wavelengths, especially when they are mixed with adjacently propagating wavelengths. Thus, there is a need to reject wideband radiation. Conventionally, such identification of laser sources requires the use of telescope and filter combinations for filtering out all radiation but the radiation of interest.

A system, which is capable of performing this task utilizing state-of-the-art technology, requires the use of three telescope/filter/detector assemblies. Two assemblies are employed to detect the laser energy and to ascertain that it is not merely a noise pulse, and one assembly is used to detect a nearby wavelength to ensure that the source did not radiate broadband radiation. Presently, there are no known instruments which are capable of simultaneously detecting and identifying radiation from more than one laser source. An assembly, which uses current technology to produce the capabilities inherent in the invention described herein, would require the use of three telescopes for each line of radiation of interest, with two telescopes being dedicated to detection of the radiation line and one being dedicated to the guardband. The physical size, cost and complexity of such a system would indeed be very great.

SUMMARY OF THE INVENTION

These and other problems and considerations are successfully addressed and overcome by the present invention. In general, a system for detecting and identifying wavelengths of laser radiation comprises various arrangements of paired filters and detectors, in which the filters have passbands which include wavelengths of interest to be identified and guardbands which enable radiation of no interest to be identified as being of no interest.

In one configuration of the present invention, the filter arrangement includes three filters, each having two passbands. The passbands of a first of the filters permit passage of radiation of first and second wavelengths, the passbands of a second of the filters permit passage of radiation of the second wavelength and a third wavelength, and the passbands of a third of the filters permit passage of radiation of the first and third wavelengths. Radiation is permitted to reach the detectors only when it passes through two aligned passbands of different filters. A single passband is insufficient and, therefore, may be said to reject system noise impulses. This embodiment may be used to reject wideband radiation, if the three laser wavelengths to be identified are spaced sufficiently close together so that they act as mutual guardbands. It may be modified in order to distinguish radiation of two sources whose wavelengths are spaced too far apart to act as mutual guardbands, by placing the passbands of the filters at wavelengths so that each wavelength of interest passes through two filters but not the third and by utilizing the third filter band as a guardband which is positioned adjacent to each of the bands of interest.

In a further embodiment, which is useful for identifying a minimum of three wavelengths, the filter arrangement comprises a number n of filters, where n is an integer of at least three, for identifying the same number n of laser wavelengths. In this embodiment, each filter has three passbands configured to pass radiation of two of the n wavelengths and the wavelength adjacent to a third of the wavelengths, where the adjacent wavelength passbands are valued to enable them to act as guardbands to the relatively adjacently positioned two passbands so that, for each wavelength, there exists only two passbands of coincident wavelengths and one guardband of adjacent wavelength.

Several advantages are derived from these arrangements. The costs of optical equipment, to identify wavelengths of interest and to reject those which are not of interest, is significantly reduced over conventional equipment. This savings in cost becomes significant as the number of laser wavelengths to be identified increases. In addition, because the optical, detection and electronic systems serve multiple purposes, there is a very large reduction in both size and weight of the system, which is a very important consideration for uses where mobile or transportable requirements are primary concerns. Furthermore, reduced overall system complexity also increases its reliability and operational life.

Other aims and advantages, as well as a more complete understanding of the present invention, will appear from the following explanation of exemplary embodiments and the accompanying drawings thereof.

BRIEF DESCRIPTION OF DRAWINGS

FIGS. 6a–6g illustrate matrices (in which matrices 6a and 6c correspond to the graphs depicted respectively in FIGS. 4 and 5) which comprise columns of n laser wavelengths (where n is an integer of at least 3) and rows of n filters having passbands designated by letters a, n, . . . n and guardbands designated by letters a', b', . . . n', the matrices being qualified in that each row must contain two passbands of different wavelengths (selected from passbands a, b, . . . n) and one guardband of different wavelength (selected from guardbands a', b', . . . n') and that each column must contain two passbands for the same predetermined wavelength (two of a, b, . . . n) and one guardband for a wavelength (selected from a', b', . . . n') adjacently positioned to a predetermined wavelength.

It is to be understood that these matrices are illustrative of all possible arrangements. Thus, different filter configurations will also be satisfactory for any given number of lines.

DESCRIPTION OF THE PREFERRED EMBODIMENTS

Figure 1:
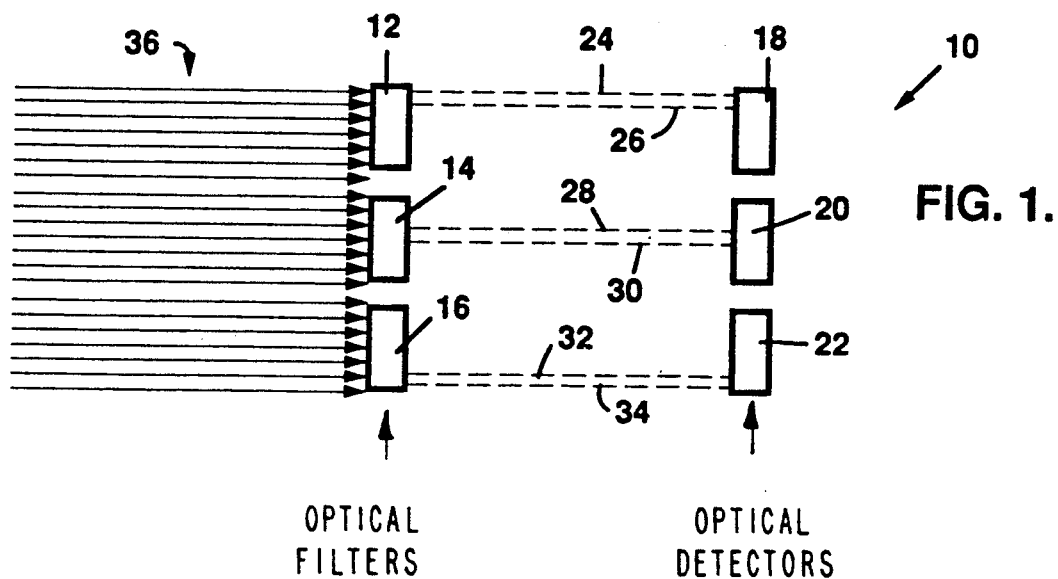
FIG. 1 is a representation of an illustrative system employing three filters and three detectors which may be components of the same or separate telescopes, and in which the filters are positioned in the path of laser radiation for identifying selected wavelengths by permitting such radiation to pass through two of the three filters to the detectors.

As shown in FIG. 1, a laser identification system 10 includes three optical filters 12, 14 and 16, each having its respective optical detector 18, 20 and 22. All optical filters and detectors are of conventional design. Filters 12, 14 and 16 may be made part of separate telescopes or may be incorporated into a single telescope, as may be desired. Each of the filters have passbands which operate at selected wavelengths, in order to permit transmission of wavelengths of electromagnetic radiation at the particular wavelengths, such as shown for illustrative purposes as radiation lines 24 and 26 for filter 12, lines 28 and 30 for filter 14, and lines 32 and 34 for filter 16. While each of the filters is illustrated as having two passbands for permitting passage of radiation of two wavelengths, it is to be understood that the filters may have as many passbands as are needed, as will become apparent in the forthcoming description of the various embodiments of the present invention. It is apparent, therefore, that radiation 36, covering any bandwidth or spectrum, which is directed toward optical filters 12, 14, and 16, will be operated upon by the filters so that only predetermined wavelengths will be permitted to pass through the filters for receipt and detection by detectors 18, 20 and 22.

The intensities of radiation passing through the detectors as a function of wavelength are illustrated in FIGS. 2–5. FIGS. 6a–6g depict seven matrices of filter responses and wavelength detections which are permitted to be detected by detectors whose number corresponds to the number of filters. Therefore, the matrix shown in FIG. 6a corresponds to responses depicted in FIG. 4, while the matrix shown in FIG. 6c corresponds to the responses illustrated in FIG. 5.

Figure 2:
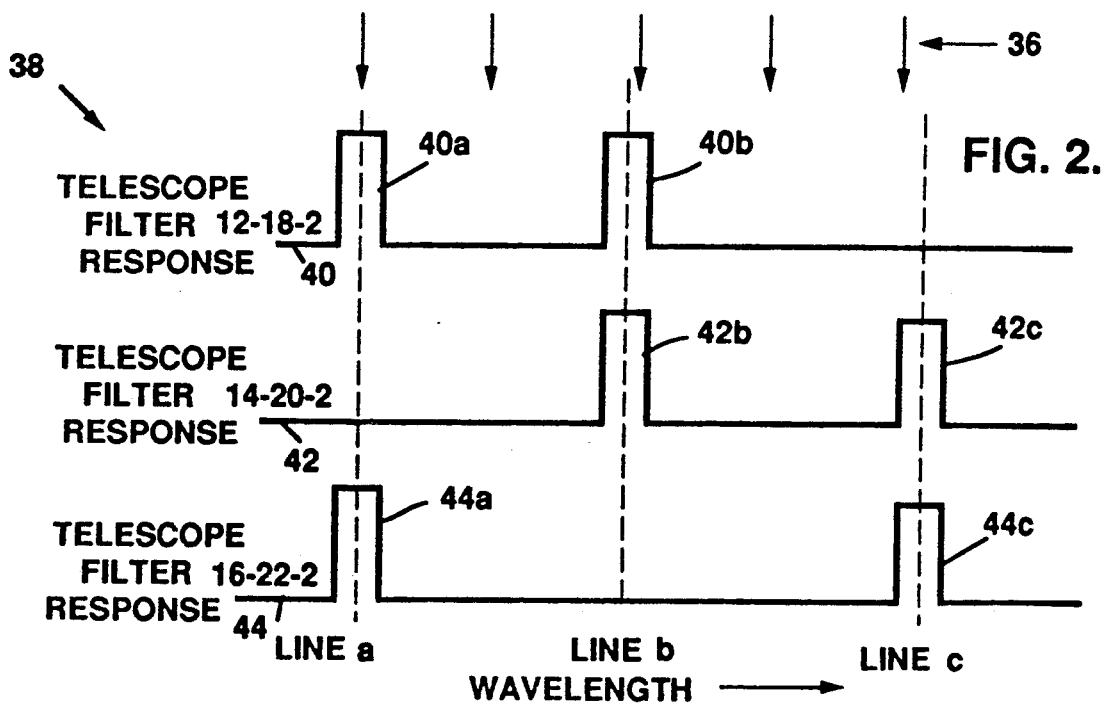
FIG. 2 is a graph depicting how three laser wavelengths may be identified by means of three telescopic filters having passbands for such wavelengths which are sufficiently close together that one acts as a guardband for an adjacent wavelength of interest.

Referring now to FIG. 2, a laser radiation identification system 38 comprises three filter/detector pairs 12-18-2, 14-20-2 and 16-22-2 whose detector responses are denoted by indicia 40, 42 and 44. Each filter of each pair has two very narrow passband lines, which are designed to permit passage of specific wavelengths lines identified as wavelengths a, b, and c, such that response 40 has passband responses 40a and 40b denoting passage of wavelengths a and b. The second filter/detector pair having response 42 has two passband responses 42b and 42c, which denote passage of wavelengths b and c. The filter/detector pair whose response is denoted by indicium 44 also has passband responses 44a and 44c which are valued to denote passage of wavelengths a and c. These very narrow filter passbands are selected so that three different wavelengths a, b and c of incoming radiation 36, may be unambiguously determined by use of the proper analysis algorithms. False alarms can be made very rare by proper parameter selection. Wideband radiation is also identified as not being of laser origin or, at least, of a wavelength which is not of interest.

As is evident, each focal plane in detectors 18, 20 and 22 (see FIG. 1) is illuminated by radiation from two of the three lasers of interest. No two focal planes are illuminated by the same two lasers. The focal plane in the detector associated with filter/detector pair 12-18-2 sees the wavelengths of the radiation emanating only from those lasers whose wavelengths are at a and b, filter/detector pair 14-20-2 permits passage and detection of radiation at wavelengths b and c and filter/detector pair 16-22-2 permits passage and detection of radiation at wavelengths a and c.

Because the fields of view of all filters coincide, the laser sources are imaged at corresponding points in the focal planes of the associated detectors which receive the radiation. If the filters are illuminated by a laser of wavelength a, for example, the image will appear in the corresponding points in the focal planes of the detector of pairs 12-18-2 and 16-22-2. The focal plane in pair 14-20-2 will see nothing.

From the identity of the focal planes receiving radiation, the identity of the laser may be determined. For example, if focal planes in pairs 12-18-2 and 14-20-2 are activated, they must have received radiation from a laser operating at a wavelength b. Similarly, focal planes in the detectors in pairs 12-18-2 and 16-22-2 indicate the passage of radiation through the filters of these two pairs to indicate a laser having radiation a, and the focal planes in detectors of pairs 14-20-2 and 16-22-2 indicate passage of radiation through the filters of those pairs which indicates radiation c from a laser. Broadband light will be received by all three focal planes. Noise pulses generated in either the focal plane or following processes will affect only one of the focal planes. By proper selection of operating parameters, the simultaneous generation of noise pulses in two channels and, thus, a false alarm, may be made exceedingly rare.

If a very short window is defined during which two events must be detected at the focal planes of independent detectors for them to be considered to be from the same source, the probability of random noise or false alarms causing these two events becomes very small. This inherently low false alarm rate allows for the detection of signals with very low signal-to-noise ratios and, therefore, very sensitive systems.

Figure 3:
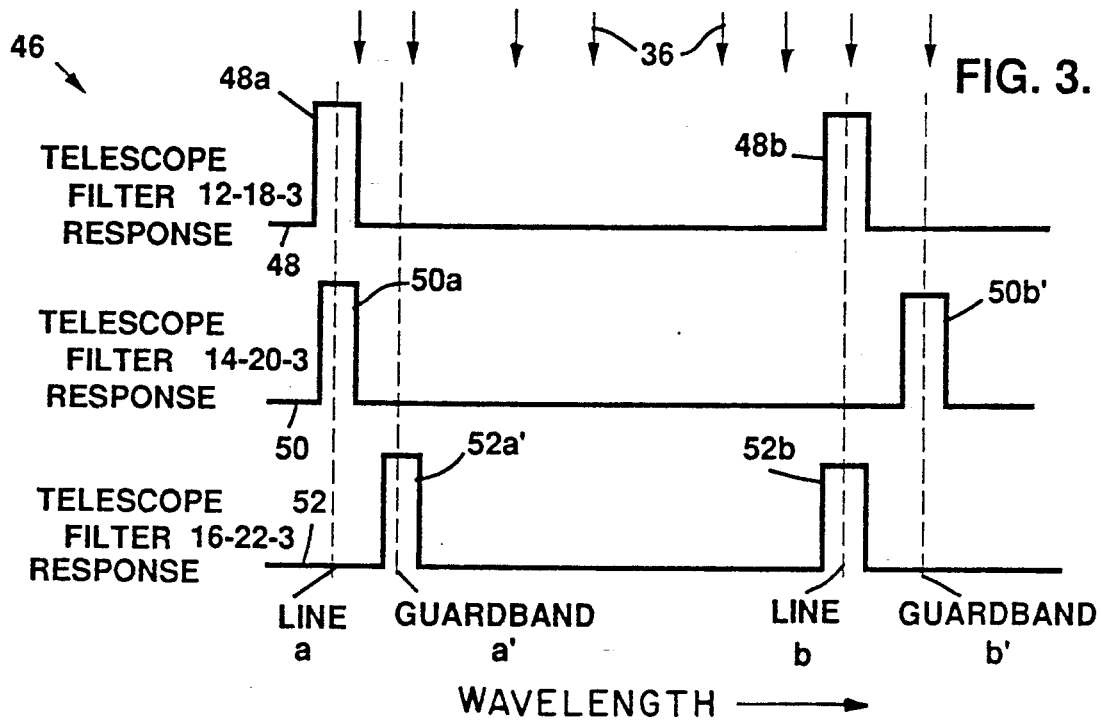
FIG. 3 is a graph depicting how two laser wavelengths may be identified by means of three telescopic filters having passbands for the two wavelengths, which need not be close together but in which a closely positioned band acts as a guardband for each adjacent wavelength of interest.

Referring now to FIG. 3, a laser identification system 46 comprises three filter/detector pairs 2-18-3, 14-20-3 and 16-22-3, each having respective filter responses 48, 50 and 52. Each filter has two very narrow passbands which are selected so that two different wavelengths a and b of incoming radiation may be unambiguously determined. The scheme depicted in FIG. 3 utilizes passbands and guardbands such that the filter in pair 12-18-3 has a pair of passbands 48a and 48b, the filter in pair 14-20-3 has a passband 50a and a guardband 50b' and the filter in pair 16-22-3 has a guardband 52a' and a passband 52b. The passbands shown in FIG. 3 permit passage of the laser wavelengths of interest and guardbands for preventing passage of laser wavelengths that are as close to the wavelengths as is desired. Each focal plane is, therefore, illuminated by two narrow spectral bands. The focal plane for the detector in pair 12-18-3 sees the two lasers of interest whose wavelengths are at wavelengths a and b. The focal plane in the detector for pair 14-20-3 sees laser radiation a and the guardband for laser radiation b. The focal plane in the detector for pair 16-22-3 sees the guardband for radiation a and laser radiation b. No two focal planes are illuminated by the same two radiation lines.

Because the fields of view of the telescope or telescopes housing the filter/detector pairs coincide, the radiation from laser sources is imaged at corresponding points in the focal planes of the telescope detectors whose filters pass laser radiation. If the detectors in pairs 12-18-3 and 14-20-3 are illuminated by a laser of wavelength a, the image will appear in the corresponding points in the focal planes of these pairs. The focal plane for filter/detector pair 16-22-3 will see nothing. If a source broader than a laser, radiating near wavelength a, is in the system's field of view, the focal plane in pair 16-22-3 will also see it and the source will be rejected as a laser.

From the identity of the focal planes receiving radiation, the identity of the laser may be determined. For example, if the focal planes for pairs 12-18-3 and 14-20-3 are activated, they must have received laser radiation a. Similarly, the focal planes in pairs 12-18-3 and 16-22-3 indicate laser radiation b. No single source can be seen by just focal planes in pairs 14-20-3 and 16-22-3. Therefore, reception in the focal planes in these last two pairs must be a false alarm. If all three focal planes and their respective electronic channels are reasonably matched, detections in focal planes following filters in pairs 14-20-3 and 16-22-3 only may be used to determine the false alarm rate of the system and its response to lasers. Broadband light will be received by all three focal planes. Noise pulses generated in either the focal plane or following processes will affect only one of the focal planes. By proper selection of operating parameters, the simultaneous generation of noise pulses in two channels, and thus a false alarm, may be made exceedingly rare.

As with the embodiment depicted in FIG. 2, the embodiment of FIG. 3 has an inherently low false alarm rate to allow for the detection of signals with very low signal to noise ratios and, therefore, are very sensitive systems.

The use of the close guardbands also ensures that relatively narrow band non-laser radiation will be rejected. This provides for high confidence in the system of FIG. 3 that it will truly identify only laser radiation as coming from lasers. An added feature of system 46 is that it has a built-in measurement system to establish its false alarm rate.

Figure 4:
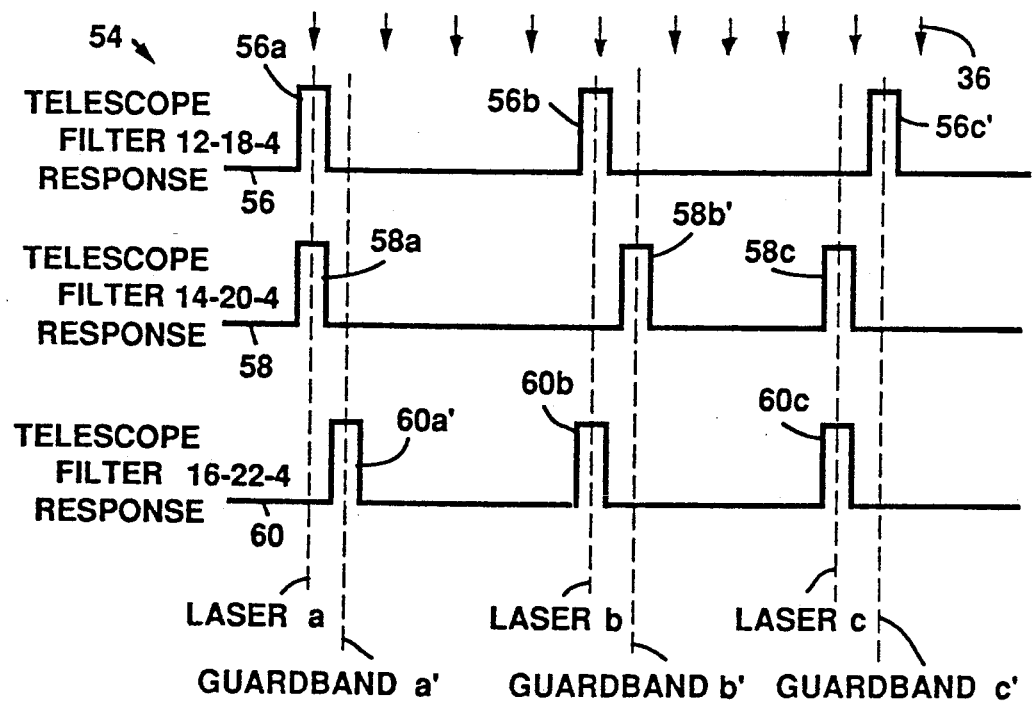
FIGS. 4 and 5 are graphs depicting how any number (n, where n is an integer of 3 or greater) of laser wavelengths (a, b, . . . n) may be passed for identification by means of n telescopic filters having passbands (a, b, . . . n) and guardbands (a', b', . . . n') for three of the n wavelengths, in which the guardbands are closely positioned to the wavelengths of interest.
Figure 5:
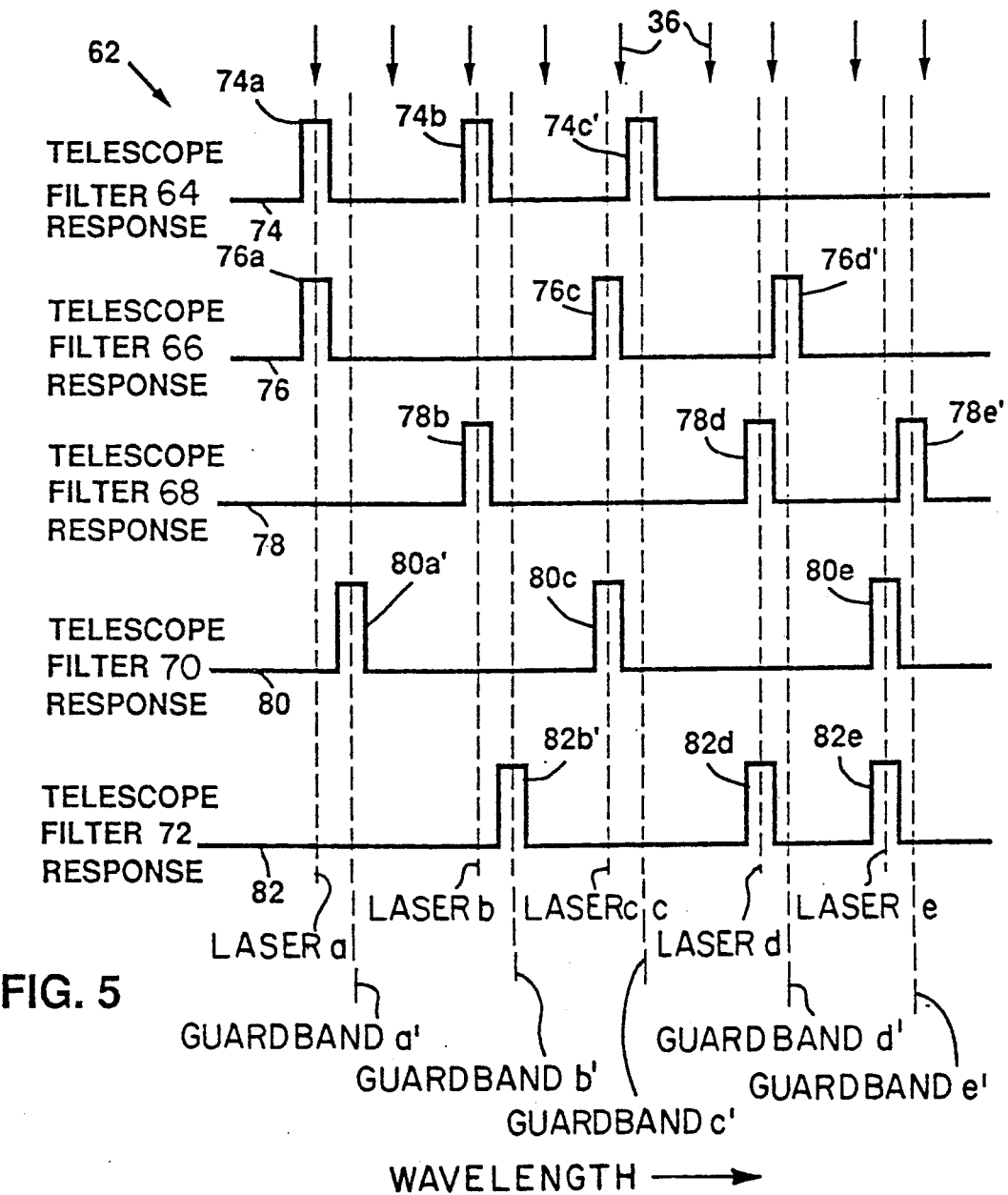

FIGS. 4 and 5 depict systems 54 and 62 which illustrate how any number of laser wavelengths, specifically illustrated as respectively numbering 3 and 5, and designated as wavelengths a through c and a through e, may be identified by means of an equal number of telescopic filters having passbands, designated by a, b, ... n and guardbands designated by a', b', ... n' for three of the −2n wavelengths. Each of the filters has three very narrow passband lines. The filter passbands are selected so that as many different wavelengths of incoming radiation 36 as there are filters may be unambiguously determined. Each wavelength is detected in exactly two filters simultaneously. Associated with each wavelength is a filter which is sensitive to a guardband for that wavelength, thereby rejecting broader band light.

In system 54 depicted in FIG. 4, filter/detector pairs 12-18-4, 14-20-4 and 16-22-4 are constructed to provide responses 56, 58 and 60. Pair 12-18-4 has a pair of passbands which permit passage of radiation designated by indicia 56a and 56b and a guardband whose response is designated by indicium 56c'. Filter 14-20-4 provides for passband responses 58a and 58c and a passband response designated by indicium 58b'. Filter 16-22-4 provides for a guardband response of 60a' and passband responses 60b and 60c.

For FIG. 4, it is seen that each of the laser lines a, b, and c of interest has a very close guardband a', b' and c' associated with it. For each laser line, two filters pass the line of interest and one filter passes radiation at the guardband. For laser radiation to be declared, it must be detected only in the filters that pass its wavelength and not by the filter at the guardband wavelength. In practice, restrictions on the guardband require that it must fall in a transmission window that is at least as good as that for the laser line (assuming that the system is used in the atmosphere), and that it is far enough from the laser line so that the filter window never includes the laser line regardless of wavelength shifts caused by operating temperature changes and field-of-view angles. FIG. 4 shows that each focal plane may be illuminated by radiation from two of the three lasers of interest, and that no two focal planes are illuminated by the radiation from the same two lasers. The focal plane for filter/detector pair 12-18-4 sees laser radiation a and b and the guardband for radiation c. Filter/detector pair 14-20-4 sees laser radiation a and c and the guardband for radiation b. Pair 16-22-4 sees laser radiation b and c and the guardband for radiation a.

As in the prior embodiments, because the fields of view of the telescope or telescopes coincide, laser sources are imaged at corresponding points in the focal planes for the associated filters that pass their radiation. If the filters in pairs 12-18-4 and 14-20-4 are illuminated by a laser of wavelength a, the image passing through these filters will appear in corresponding points in the focal planes of these two pairs. The focal plane for filter 16-22-4 will see nothing.

From the identity of the focal planes receiving radiation, the identity of the laser may be determined. For instance, if focal planes in the detectors for pairs 12-18-4 and 14-20-4 are activated, they must have received radiation a from its laser. Similarly, focal planes in pairs 12-18-4 and 16-22-4 receiving radiation indicate radiation at wavelength b, and focal planes in pairs 14-20-4 and 16-22-4 receiving radiation indicate laser radiation c. Light that is slightly more broadband than that from a laser will be received from all three focal planes. Noise pulses generated in either of the focal plane or following processes will affect only one of the focal planes. By proper selection of operating parameters, the simultaneous generation of noise pulses in two channels, and thus a false alarm, may be made exceedingly rare.

Referring now to FIG. 5, system 62 depicts an arrangement utilizing five filter/detector pairs 64, 66, 68, 70 and 72 which are used for identifying five laser lines a, b, c, d and e. Pair 64 provides a response 74 showing passband responses 74a and 74b and a guardband response at 74c'. Filter 66 provides a response 76 with passbands 76a and 76c and a guardband 76d'. Filter 68 provides a response 78 with passband responses 78b and 78d and a guardband response 78e'. Filter 70 has a response 80 with a guardband response 80a' and passbands 80c and 80e. Filter 72 provides a response 82 with a guardband response 82b' and passband responses 82d and 82e. It is seen from FIG. 5, therefore, that wavelength a will be detected through filter/detector pairs 64 and 66, wavelength b will be detected in pairs 64 and 68, wavelength c will be detected in pairs 66 and 70, wavelength d will be detected in pairs 68 and 72, and wavelength e will be detected in pairs 70 and 72.

As stated above, if a very short window is defined during which two events must be detected at the focal planes of independent filter/detector pairs for the events to be considered to be from the same source, the probability of random noise causing these two events becomes very small. This inherently low false alarm rate allows for the detection of signals with very low signal-to-noise ratios and, therefore, very sensitive systems.

The systems shown in FIGS. 4 and 5 can be expanded for any number of filters and wavelengths. FIGS. 6a–6g show where a 3×3 matrix for three filters to identify three laser wavelengths a through c may be expanded to a matrix of 9×9 for nine filters to identify nine laser wavelengths a through i using passbands denoting radiation a through i and guardbands denoting radiation a' through i'. An inspection of these matrices show that, for each filter/detector pair extending in a row, there are two passbands and one guardband, and for each laser wavelength, which are placed in columns, there are also two passbands and one guardband. It will also be noted that, for matrices of 4×4 and greater, the rows and columns of passbands and guardbands are staggered, but each row and each column is limited to two passbands and one guardband. While only matrices up to a 9×9 matrix have been illustrated, it is obvious from the illustrations in FIGS. 6a–6g that the matrices may be extended to any number n of wavelengths to be identified by an equal number n of filter/detector pairs.

While the foregoing system has been described in terms of images in the focal plane, it is to be understood that it can also be readily constructed using non-imaging optics.

Although the invention has been described with respect to particular embodiments thereof, it should be realized that various changes and modifications may be made therein without departing from the spirit and scope of the invention.

What is claimed is:

1. A system for detecting laser radiation and for identifying wavelengths of the radiation comprising:
   filter means comprising a plurality of filters, each filter having a plurality of passbands for enabling radiation with wavelengths of interest to be identified and having guardband means for ensuring that radiation of no interest will be identified as such; and
   means for detecting and identifying the radiation having wavelengths of interest.

2. A system for detecting laser radiation and for identifying three wavelengths of the radiation while rejecting wideband radiation, comprising:
   filter means having passbands for enabling radiation with wavelengths of interest to be identified and having guardbands for ensuring that radiation of no interest will be identified as such, said filter means including three filters each having two passbands, in which said passbands of a first of said filters permit passage therethrough of radiation of first and second wavelengths, said passbands of a second of said filters permit passage therethrough of radiation of the second wavelength and a third wavelength, and said passbands of a third of said filters permit passage therethrough of radiation of the first and third wavelengths; and
   means for detecting and identifying the radiation having wavelengths of interest.

3. A system for detecting laser radiation, for identifying wavelengths of the radiation and for distinguishing radiation with a bandwidth somewhat wider than that of the radiation to be identified, comprising:
   filter means having passbands for enabling radiation with wavelengths of interest to be identified and having guardbands for ensuring that radiation of no interest will be identified as such, said filter means including three filters each having two passbands, in which said passbands of a first of said filters permit passage of radiation of first and second wavelengths, said passbands of a second of said filters permit passage therethrough of radiation of the first wavelength and radiation adjacent to the second wavelength, and said passbands of a third of said filters permit passage therethrough of radiation of the second wavelength and radiation adjacent to the first wavelength, said adjacent wavelength passbands being valued for enabling them to function as guardbands to the relative adjacently positioned first and second passbands; and
   means for detecting and identifying the radiation having wavelengths of interest.

4. A system for detecting laser radiation and for identifying a minimum of three laser wavelengths of the radiation, comprising:
   filter means having passbands for enabling radiation with wavelengths of interest to be identified and having guardbands for ensuring that radiation of no interest will be identified as such, said filter means including n filters for identifying n laser wavelengths, each said filter having three passbands permitting passage therethrough of the radiation of two of the n wavelengths and of radiation whose wavelength is adjacent to a third of the wavelengths, said adjacent wavelength passbands being valued for enabling them to act as guardbands to the relative adjacently positioned two passbands, in such a manner that, for each wavelength, there exists only two passbands of coincident wavelength and one guardband of adjacent wavelength in respective ones of said filters; and
   means for detecting and identifying the radiation having wavelengths of interest.

5. A system for detecting laser radiation and for identifying a minimum of three laser wavelengths, comprising:
   filter means having passbands for enabling radiation with wavelengths of interest to be identified and having guardbands for ensuring that radiation of no interest will be identified as such, said filter means being configured into matrices which comprise columns of n laser wavelengths and rows of n filters having passbands designated by letters a, b, . . . n and guardbands designated by letters a', b', . . . n' closely positioned to respective ones of said passbands, the matrices being qualified in that each row must contain two passbands which permit radiation of different wavelengths to respectively pass therethrough and one guardband which ensure rejection of wavelengths closely positioned to the respective radiation permitted to pass, and that each column must contain two passbands for the same predetermined wavelength and one guardband for a wavelength adjacently positioned to its predetermined wavelength; and means for detecting and identifying the radiation having wavelengths of interest.

* * * * *